No. 12,701. REISSUED OCT. 8, 1907.

E. J. SMITH, DEC'D.

THE AMERICAN DAIRY SUPPLY CO., ASSIGNEE.

JAR CAP.

APPLICATION FILED MAY 27, 1907.

Witnesses
E. R. Peck
A. H. Ehrling

Inventor
E. J. Smith,
deceased.
The American Dairy Supply Co.
assignee
By
Herbert E. Peck
Attorney

UNITED STATES PATENT OFFICE.

THE AMERICAN DAIRY SUPPLY CO., OF AUGUSTA, MAINE, AND WASHINGTON, DISTRICT OF COLUMBIA, A CORPORATION OF MAINE, ASSIGNEE, BY MESNE ASSIGNMENTS, OF ELDRIDGE J. SMITH, DECEASED.

JAR-CAP.

No. 12,701. Specification of Reissued Letters Patent. Reissued Oct. 8, 1907.

Original No. 765,049, dated July 12, 1904, Serial No. 176,999. Application for reissue filed May 27, 1907. Serial No. 378,027.

*To all whom it may concern:*

Be it known that ELDRIDGE J. SMITH, since deceased, and late a citizen of the United States, and a resident of Washington, District of Columbia, did invent certain new and useful Improvements in Jar-Caps; and THE AMERICAN DAIRY SUPPLY CO., of Augusta, Maine, and Washington, District of Columbia, assignee of the entire interest therein and thereto, hereby declares the following to be a full, clear, and exact description of the invention, such as will enable others skilled in the art to which it appertains to make and use the same.

This invention has relation to jar caps; and it consists in the novel construction and arrangement of its parts, as hereinafter described.

The object of the invention is to provide a jar-cap especially designed to be used on milk jars or bottles, the cap being so constructed that it may be easily removed without having to use a fork or other sharp instrument, or it may be opened by swinging back a section, which section may be closed while the cap is in place in the throat of the jar.

Figure 1:
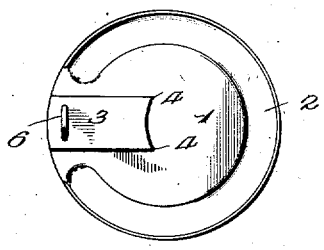
Figure 3:
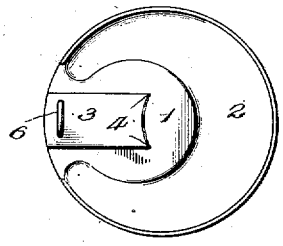
Figure 2:
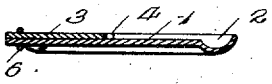
Figure 4:
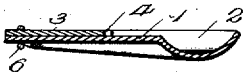
Figure 5:
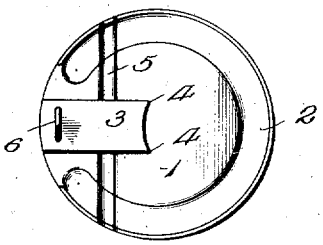
Figure 6:
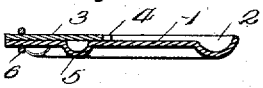

In the accompanying drawings, Figure 1, is a top plan view of a preferred form of a cap. Fig. 2, is a transverse sectional view of the same. Fig. 3, is a top plan view of a modified form of the cap. Fig. 4, is a transverse sectional view of the same. Fig. 5, is a top plan view of still another modified form of the cap. Fig. 6, is a transverse sectional view of the same; and Fig. 7, is a transverse sectional view of the top of a jar, showing the form of cap as shown in Fig. 5, in position therein with its swinging section open.

In the form of the invention as shown in Figs. 1 and 2, the cap 1, is provided at its edge with the crescent-shaped or interrupted corrugation 2, the inner edge of which is concentric with relation to the center of the said cap. The outer edge of said corrugation extends upwardly and outwardly, while the portion of the cap embraced within corrugation 2 is plane and on a level with the space separating the ends of the corrugation. The handle 3 is secured to the cap at a point between the ends of the corrugation 2, and the inner or free end of the said handle 3, is provided with the pointed corners 4, whereby the person may readily slip the nail under the edge of the cap to elevate the free end and secure a grip thereon. In moving the cap from the jar the handle 3 is given a pull at an oblique to the diameter of the cap. The strain thereof causes the middle of the corrugation to contract slightly, thus permitting the edge of the cap at the point where the handle 3 is attached thereto to escape the groove in the throat of the jar, whereby the said cap is easily removed.

In the form of the invention as shown in Figs. 3 and 4, the construction of the cap is the same as that shown and described in Figs. 1 and 2, with the exception that the inner edge of the corrugation 2 is located eccentric with relation to the center of the cap 1, and the said corrugation is consequently broadened at its middle, which construction permits the said corrugation to contract more easily.

Figure 7:
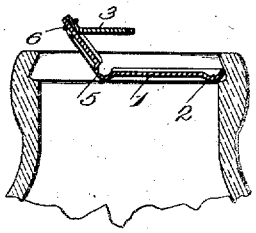

In the form of the invention as shown in Figs. 5, 6, and 7, the cap is provided with a transverse crease 5, which is preferably located to one side of the center of the said cap. This crease serves as a hinge upon which one of the sections of the cap may be swung up without removing the cap entirely from the throat of the jar. Through the opening all or a part of the contents of the jar may be poured out, and then the said swinging section may be closed back to its original position, when the contents of the jar, if any, will be confined, and the jar may with safety be placed upon the ice, as the contents thereof cannot run out should the jar capsize. The advantage of placing said crease to one side of the center of the cap is that the section of the cap which remains in permanent contact with the throat of the jar has greater frictional contact-surface, and thus is held more firmly in contact with the jar than the swinging section.

The cap is formed with a flat horizontal or plain top surface extending from its central portion to its periphery or edge, whereby the flat handle 3, can throughout its length rest flat on and parallel with said top surface of the cap and can extend inwardly and about radially of the cap from its edge or periphery, and whereby the outer end of the handle can be secured to the edge portion of or closely adjacent to the edge of the cap by the clip or staple 6, passed through the handle and cap and tightly clamping together the flat end of the handle and flat edge portion of the disk. When the handle is once lifted a crease is produced therein at the point of juncture with the cap, which indicates that the contents of the jar may have been tampered with. The further advantage of so locating the handle is that in exerting the lateral or oblique pull to remove the cap a greater leverage is gained, and consequently the cap may be more readily removed than if the said handle were attached at a point nearer to the center.

By cutting the edge of the handle 3 on the same arc as that of the edge of the disk the points 4, are formed at the corners of the said handle, and the handle-stock is economized, for the said stock may be fed in strips to the cap and cut off at the time that it is secured to the cap. The same incision which conforms to the edge of the cap also produces the points on the next handle above referred to. The outer end of the flat handle is cut off flush with the periphery or edge of the cap forming the curved end edge of the handle concentric with the cap edge, so that when the cap is being initially released from the jar mouth, the pull of the handle is directly transmitted to the flat edge portion of the cap.

Having described the invention, what is claimed is—

1. A jar-cap consisting of a disk having a corrugation with its ends located within the edge of the disk.

2. A jar-cap consisting of a disk having a corrugation with its ends located within the edge of the disk, the edge of said corrugation being in alinement with that of the cap.

3. A jar-cap consisting of a disk having a corrugation with its ends located within the edge of the disk, said corrugation having an upwardly and outwardly extending edge adapted to come in contact with the jar.

4. A jar-cap consisting of a disk having a corrugation with its ends located within the edge of the disk, a handle secured to the cap in the space between the ends of the corrugation.

5. A jar-cap consisting of a disk having a corrugation embracing a plain surface and having its ends located within the edge of the disk, a handle secured to the cap in the space between the ends of the corrugation and adapted to lie flat upon said plain surface.

6. A jar-cap consisting of a disk having a flat top face extending from the central portion thereof to the edge of the disk, and a flat handle on said flat face and extending inwardly of the disk and at its outer end secured to the disk adjacent to its outer edge with its outer end edge flush with the disk edge, substantially as described.

7. A jar-cap consisting of a disk, a handle attached to said disk and having its free edge cut on the same arc as the edge of the cap whereby projecting points are formed at the corners of the handle.

8. A jar-cap consisting of a disk having a corrugation the inner edge of which is eccentric with the disk.

9. A jar-cap consisting of a disk having a corrugation with its ends located within the edges of the disk the inner edge of said corrugation being eccentric with the disk.

10. A jar-cap consisting of a disk having a corrugation with its ends located within the edge of the disk, the outer edge of which is concentric with the disk and the inner edge eccentric therewith.

11. A jar-cap consisting of a disk having a corrugation, the outer edge of which is concentric with the disk and the inner edge eccentric therewith.

12. A jar-cap consisting of a disk having a corrugation with its ends located within the edge of the disk, the outer edge of the corrugation being in alinement with the edge of the disk and the inner edge eccentric therewith.

13. A jar-cap consisting of a disk having a curved corrugation and a transverse crease.

14. A jar-cap consisting of a disk having a peripheral corrugation and a transverse crease.

15. A jar cap consisting of a disk having a flat plain top surface extending to the edge thereof, and a flat handle at its outer end portion fixed to the flat edge portion of the disk, the handle extending inwardly along the flat surface of the disk and adapted to be bent upwardly and exert a direct pull on said flat edge portion of the disk to initially release the same during the operation of removing the cap from the jar mouth.

16. A jar-cap consisting of a disk having a curved corrugation and a transverse crease entering said corrugation.

17. A jar-cap consisting of a disk having a corrugation with its ends located within the edge of the disk and a transverse crease.

18. A jar-cap consisting of a disk having a corrugation with its ends located within the edge of the disk and a transverse crease located on one side of the center of the disk.

19. A jar cap consisting of a disk having a flat plain top surface, and a flat handle extending inwardly of the disk on said flat surface from the outer edge thereof and at its outer end secured flat on and to the flat edge portion of the disk.

20. A jar-cap consisting of a disk having a corrugation with its ends located within the edge of the disk and a transverse crease, and a handle attached to the disk.

21. A jar-cap consisting of a disk having a curved corrugation the ends of which are spaced apart.

22. A receptacle closure consisting essentially, of a disk having a flat handle arranged throughout its length on the top surface thereof and extending inwardly with its outer edge cut off flush and concentric with the disk edge, and a staple securing the outer end portion of the handle down on the top surface of the edge portion of the disk, substantially as described.

23. A receptacle closure comprising a disk having a flat edge portion, a handle arranged on the top surface thereof, and means passing through the disk and handle and clamping its outer end down on the top surface of said edge portion of the disk, substantially as described.

24. A receptacle closure comprising a disk having a flat edge portion, a flat short narrow handle arranged radially of and on the top surface of the disk, and a staple securing the outer end portion of said handle down on the top surface of said flat edge portion of the disk.

In testimony whereof THE AMERICAN DAIRY SUPPLY CO. hereunto affixes its seal and sets its hand through and by its president in the presence of two witnesses.

THE AMERICAN DAIRY SUPPLY CO. [L. S.]
By E. E. TAYLOR, JR., *President.*

Witnesses:
S. W. BRIGGS,
H. R. DURYEE.